(No Model.)
C. L. CHAPMAN.
FENCE.
No. 579,736. Patented Mar. 30, 1897.
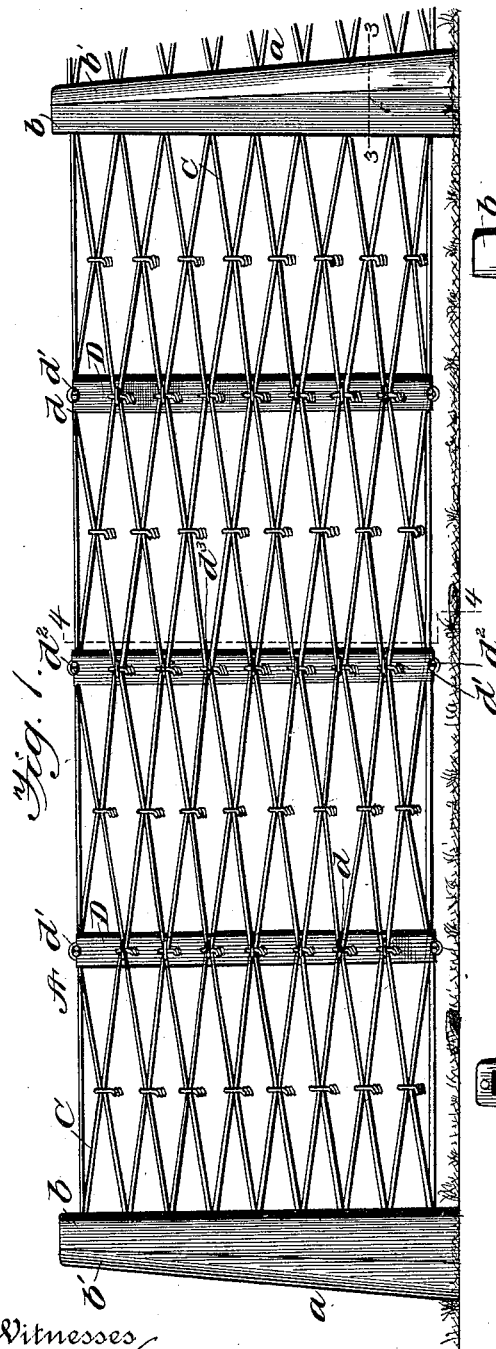
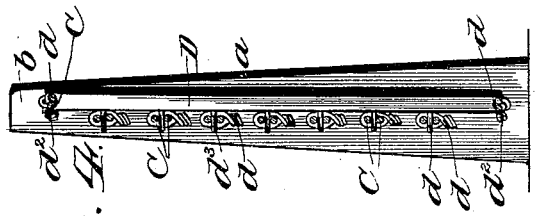
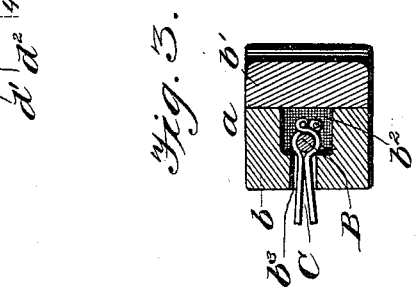
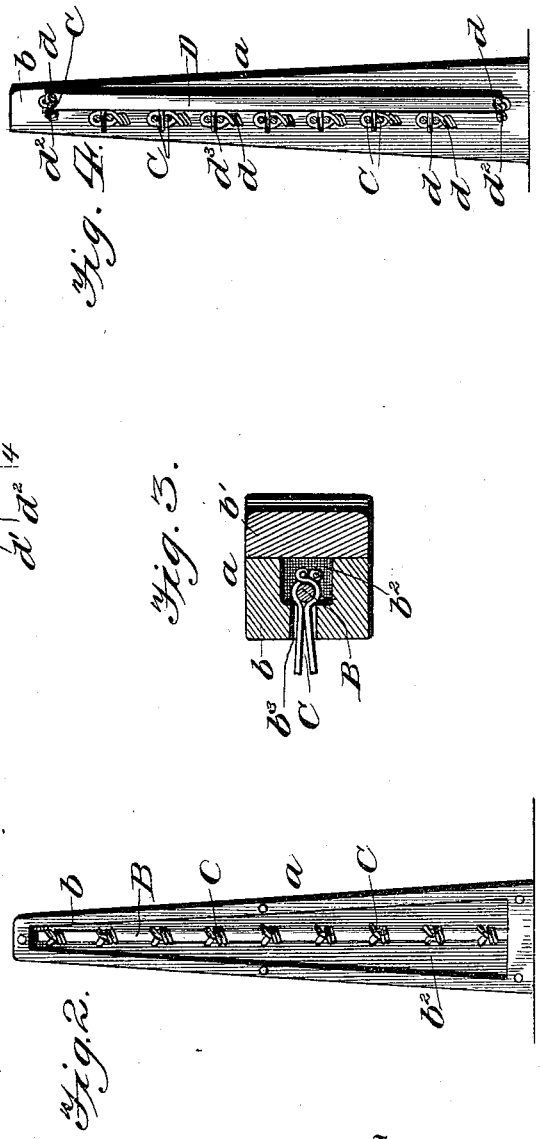
Witnesses
Inventor

UNITED STATES PATENT OFFICE.

CLIFFORD LAFAYETTE CHAPMAN, OF ELDRED, MICHIGAN.

FENCE.

SPECIFICATION forming part of Letters Patent No. 579,736, dated March 30, 1897.

Application filed July 25, 1896. Serial No. 600,497. (No model.)

*To all whom it may concern:*

Be it known that I, CLIFFORD LAFAYETTE CHAPMAN, a citizen of the United States, residing at Eldred, in the county of Jackson and State of Michigan, have invented certain new and useful Improvements in Fences; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in fences; and it has for its object the production of a fence which will be simple and inexpensive in construction, strong and durable, and one which can be erected with but a minimum expenditure of time and labor.

In carrying out my invention I erect a series of posts in the ground and connect the same by suitable fence-wires, which are drawn taut between said posts, said wires being additionally stiffened by means of short posts which fit between the topmost and lowermost wires. The posts are each formed with interior chambers adapted to receive stay-rods, around which the fence-wires are passed and twisted, said wires being passed through suitable holes or perforations in said posts.

The invention will be hereinafter fully set forth, and particularly pointed out in the claims.

In the accompanying drawings, Figure 1 is a view in side elevation, illustrating my improved fence. Fig. 2 is an end view thereof with a portion of the fence-post removed. Fig. 3 is a sectional view on the line 3 3, Fig. 1. Fig. 4 is a sectional view on line 4 4, Fig. 1.

Referring to the drawings, A designates my improved fence as an entirety, the same being supported by vertical posts $a$, which are erected in the ground and preferably made of tapering form, as shown. Each of these posts is made in two parts or sections $b\ b'$, the former being the main section and having a longitudinal chamber $b^2$ formed therein, while the section $b'$ serves as a cover for said chamber. These sections are united together by any suitable means.

The chamber $b^2$ is designed to receive a rod B, around which the ends of the fence-wires C are secured, preferably by twisting, said wires being passed through holes or openings $b^3$ in part or section $b$. The fence-wires, after being passed through said holes or openings, are extended around said rods and then twisted in any preferred manner. In this way they are prevented from slipping or becoming slack.

Between the topmost and lowermost wires are secured a series of short posts D, which are provided with grooves $d$ in their upper and lower ends adapted to receive said wires. Cross-grooves $d'$ are also formed in the ends of said posts and are designed to receive loops $d^2$, which serve to bind the two topmost and lowermost wires together. It will be noted that the fence-wires are all alternately united in pairs by a series of such loops, and where said wires are so joined adjacent to the posts D they are secured to said posts by means of staples or the like $d^3$.

From what has been said it will be seen that I have produced a fence which is exceedingly simple and inexpensive in construction, the same being strong and durable and not liable to readily get out of order or become deranged. It will be specially observed that by placing the short posts between the uppermost and lowermost wires of the fence great stiffness in the structure is attained. The joining of the alternate wires also serves to keep said wires taut. It will also be noted that the fence-wires can be easily stretched, should they become slack, by removing the removable section of one of the fence-posts, whereupon the ends of said wires can be twisted.

Another important feature of my invention is the manner in which the top and bottom wires are arranged. The two topmost and two lowermost wires are each alternately passed over the ends of two of the short posts in a straight line and then bent toward and united to the next adjacent fence-wire. In this way great stability is given to the fence.

I claim as my invention—

1. The herein-described fence, comprising a series of vertical posts formed of two separable parts or members one of said parts being provided with an interior chamber, fence-wires having their ends projected into said chambers, rods located in said chambers and around which said wires are secured, and means for uniting the parts or members of said posts, whereby said rods are inclosed therein, as set forth.

2. The herein-described fence, comprising a series of vertical posts formed of two separable parts or members and having interior chambers, fence-wires having their ends projected into said chambers, rods located in said chambers and around which said wires are secured, short posts having grooves in their ends adapted to receive the topmost and lowermost wires, which are alternately passed over the ends thereof in a straight line and then united to the next adjacent wire, and means for securing all of said wires to said latter posts, as set forth.

3. The herein-described improved fence, comprising a series of supporting-posts, fence-wires connecting said posts, wire loops uniting said fence-wires in alternate pairs, and short posts to which said wires are connected, the topmost and lowermost wires being each alternately passed over the ends of two of said short posts in a straight line and then bent toward and united to the next adjacent wire, as and for the purpose set forth.

In testimony whereof I affix my signature in presence of two witnesses.

CLIFFORD LAFAYETTE CHAPMAN.

Witnesses:
TOWNSEND CHAPMAN,
ARTHUR M. BAKER.